Patented Apr. 18, 1944

2,346,969

UNITED STATES PATENT OFFICE 2,346,969

PRINTING INK

Francis J. Jeuck, Chicago, and Charles A. Rietz, Park Ridge, Ill., assignors to Interchemical Corporation, New York, N. Y., a corporation of Ohio No Drawing. Application September 15, 1942, Serial No. 458,457

2 Claims. (Cl. 106—30)

This invention relates to printing inks designed to be set by the application of water thereto and to provide an inexpensive ink of this type, characterized by good resistance to humidity during the printing operation.

Inks which may be dried by the application of water upon the freshly printed film and methods of printing with such inks are disclosed and claimed in Gessler et al. Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid.

Various methods have been suggested to overcome this problem, among others the use of rosin modified by the diene addition of maleic, fumaric acid, or similar alpha beta unsaturated acids (U. S. Patent No. 2,244,103, June 3, 1941). While somewhat improved resistance to humid weather is obtained with these inks, they still leave much to be desired.

We have now discovered that printing inks having sufficiently good moisture resistance combined with good printing properties can be obtained by using as the resin the reaction product of Vinsol and fumaric or maleic acid, or other alpha-beta unsaturated polybasic acid dissolved in a water-soluble polyglycol or polyglycol derivative. This reaction is a reaction between the single olefinic linkage present in the Vinsol and the maleic anhydride, which is not a diene reaction.

Vinsol is a material obtained in the preparation of wood rosin. In preparing the Vinsol resin, the stumps are disintegrated or shredded and the shredded material is extracted in large heated cylinders by means of a solvent such as benzol or some other suitable aromatic hydrocarbon. The solvent extracts the Vinsol resin along with the rosin, turpentine, pine oil and miscellaneous other materials from the shredded stumps, after which the liquid is subjected to a distillation process. In the distilling cycle, the solvent is the first material to be removed, followed by the turpentine and finally the pine oil, the residue consisting of rosin and Vinsol remaining in the still. The molten resin is then run into a hot mixture of gasoline and furfural. The mixture is then allowed to stand and settle until two liquid layers have formed, one consisting of gasoline and rosin, and the other consisting of Vinsol and furfural. The latter layer is then run through a continuous still whereby the furfural is removed, and the Vinsol resin comes out in a hot molten state, being run into sheet metal containers and distributed therein in the market. The exact chemical composition of the Vinsol resin is not definitely known. It has been estimated, however, that the Vinsol resin consists essentially of a highly oxidized form of abietic acid, and much smaller proportions of resin acids, poly-phenols, ligneous materials, and unoxidized abietic acid.

It has been known for some time that ordinary olefinic linkages will react with maleic anhydride, etc., to produce addition products which differ from those involving the diene synthesis, and we have found that this type of reaction product, using Vinsol as a base, makes very satisfactory water-setting ink. As typical of our invention:

Example 1—Varnish

| | Pounds |
|---|---|
| Vinsol resin | 256 |
| Fumaric acid | 64 |

Raise heat to 465° F. and hold 2 hours. Reduce to body with 308 pounds diethylene glycol.

Example 2—Black ink

| | Pounds |
|---|---|
| Carbon black | 15.10 |
| Iron blue | 5.89 |
| Methyl violet lake | .38 |
| Triethanolamine | 2.98 |
| Varnish of Example 1 | 60.99 |
| Diethylene glycol | 14.66 |
| | 100.00 |

Example 3—Blue ink

| | Pounds |
|---|---|
| Dry methyl violet lake | .500 |
| Iron blue dry | 8.000 |
| Varnish of Example 1 | 20.000 |

Examples can of course be multiplied indefinitely without departing from the scope of the invention. In particular, the fumaric acid can be replaced by any other alpha beta unsaturated polybasic acid, and the diethylene glycol can be replaced by other materials (propylene glycol, tetraethylene glycol, etc.) and by their water-soluble derivatives—e. g., the mono ethers.

We claim:

1. A typographic printing ink characterized by press-stability under humid conditions, combined with the ability to be set by the addition of water to the film of the ink, comprising essentially a solution of a resin in the solvent, the resin being obtained from the reaction product of a petroleum hydrocarbon insoluble resin derived from pine wood with an alpha beta unsaturated polybasic acid, and the solvent being one of the group consisting of water-soluble polyglycols and water-soluble polyglycol derivatives.

2. A typographic printing ink characterized by press-stability under humid conditions, combined with the ability to be set by the addition of water to the film of the ink, comprising essentially a solution of a resin in the solvent, the resin being obtained from the reaction product of a petroleum hydrocarbon insoluble resin derived from pine wood with an alpha beta unsaturated polybasic acid, and the solvent being one of the group consisting of water-soluble polyglycols and water-soluble polyglycol derivatives, in which the solvent is diethylene glycol.

FRANCIS J. JEUCK.
CHARLES A. RIETZ.